(12) United States Patent
Brailovsky

(10) Patent No.: US 8,483,498 B2
(45) Date of Patent: Jul. 9, 2013

(54) METHODS AND SYSTEMS FOR DEFINING, IDENTIFYING AND LEARNING GEOMETRIC FEATURES

(75) Inventor: Leonid Brailovsky, Herzeliya (IL)

(73) Assignee: Cognitens Ltd., Ramat Hasharon (IL)

( * ) Notice: Subject to any disclaimer, the term of this patent is extended or adjusted under 35 U.S.C. 154(b) by 1692 days.

(21) Appl. No.: 11/902,258

(22) Filed: Sep. 20, 2007

(65) Prior Publication Data

US 2008/0079729 A1  Apr. 3, 2008

Related U.S. Application Data

(60) Provisional application No. 60/846,091, filed on Sep. 21, 2006.

(51) Int. Cl.
*G06K 9/48* (2006.01)

(52) U.S. Cl.
CPC .................................. *G06K 9/48* (2013.01)
USPC ........... 382/242; 382/199; 382/203; 382/241; 382/243; 345/420

(58) Field of Classification Search
USPC ........... 382/199, 202, 203, 241–243; 345/420
See application file for complete search history.

(56) References Cited

U.S. PATENT DOCUMENTS

| | | | |
|---|---|---|---|
| 2,397,702 A | 4/1946 | Smith et al. | |
| 2,432,928 A | 12/1947 | Palmquist | |
| 2,440,584 A | 4/1948 | Heltzer et al. | |
| 2,543,800 A | 3/1951 | Palmquist et al. | |
| 4,104,102 A | 8/1978 | Eagon et al. | |
| 5,351,196 A * | 9/1994 | Sowar et al. | 345/420 |
| 5,434,803 A | 7/1995 | Yoshida | |
| 5,754,187 A * | 5/1998 | Ristow et al. | 345/469 |
| 5,990,897 A * | 11/1999 | Hanratty | 345/420 |
| 6,212,481 B1 | 4/2001 | Kume | |
| 7,042,451 B2 * | 5/2006 | Venkataraman et al. | 345/420 |
| 2003/0059116 A1 | 3/2003 | Kupeev et al. | |
| 2004/0037463 A1 * | 2/2004 | Calhoun et al. | 382/186 |

OTHER PUBLICATIONS

Hiroshi Sakurai and David C. Gossard, "Recognizing Shape Features in Solid Models", IEEE, Computer Graphics and Applications, vol. 10 Issue 5, Sep. 1990, pp. 22-32.*
Sohn, K., et al., "Boundary Representation With Lines and Circular Arcs Using Boundary Split-And-Merge Method", Proceedings of the SouthEast Conference Apr. 7-10, 1991, New York, *IEEE*, vol. 1, pp. 707-711 (Apr. 7, 1991).
Loncaric, S., "A Survey of Shape Analysis Techniques", *Pattern Recognition Society*, vol. 31, No. 8., pp. 983-1001, (1998).

* cited by examiner

*Primary Examiner* — Eric Rush

(74) *Attorney, Agent, or Firm* — Vorys, Sater, Seymour and Pease LLP; Susanne M. Hopkins; William L. Klima

(57) ABSTRACT

Methods and systems are provided for defining, identifying and learning geometric features.

25 Claims, 7 Drawing Sheets

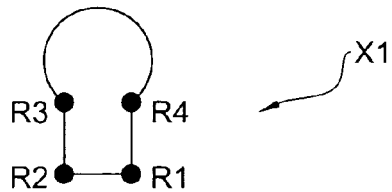

S = (4, (line-line, right, convex, equal, zero, zero),
    (line-line, right, convex, equal, zero, zero),
    (line-arc, right, convex, zero, outward, sharp)
    (arc-line, right, convex, zero, zero, zero))

FIG. 3a

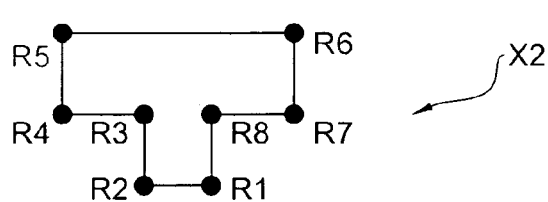

S = (8, (line-line, right, convex, smaller, zero, zero),
    (line-line, right, convex, larger, zero, zero),
    (line-line, right, concave, equal, zero, zero),
    (line-line, right, convex, larger, zero, zero),
    (line-line, right, convex, larger, zero, zero),
    (line-line, right, convex, smaller, zero, zero),
    (line-line, right, convex, smaller, zero, zero),
    (line-line, right, concave, equal, zero, zero))

FIG. 3b

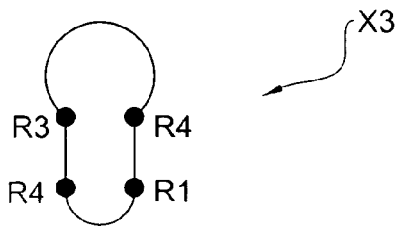

S = (4, (line-arc, right, convex, zero, outward, flat),
    (arc-line, right, convex, zero, zero, zero),
    (line-arc, right, convex, zero, outward, sharp),
    (arc-line, right, convex, zero, zero, zero))

FIG. 3c

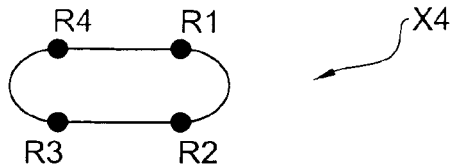

S =(4, (line-arc, right, convex, zero, outward, semicircle),
(arc-line, right, convex, zero, zero, zero),
(line-arc, right, convex, zero, outward, semicircle),
(arc-line, right, convex, zero, zero, zero))

FIG. 3d

S = (2, (arc, zero, zero, zero, outward, semicircle),
(arc-arc, zero, zero, zero, outward, semicircle))

FIG. 3e

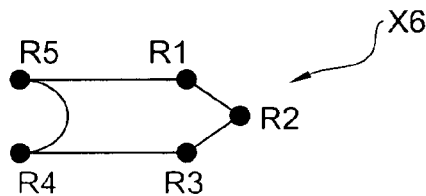

S = (5, (line-line, obtuse, convex, smaller, zero, zero),
(line-line, acute, convex, equal, zero, zero),
(line-line, obtuse, convex, larger, zero, zero),
(line-arc, right, convex, zero, inward, semicircle),
(arc-line, right, convex, zero, zero, zero))

FIG. 3f

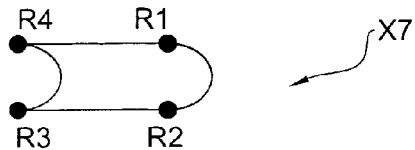

S = (5 (5, line-arc, right, convex, zero, outward, semicircle)
(arc-line, right, convex, zero, zero, zero),
(line-arc, right, convex, zero, inward, semicircle)
(arc-line, right, convex, zero, zero, zero))

FIG. 3g

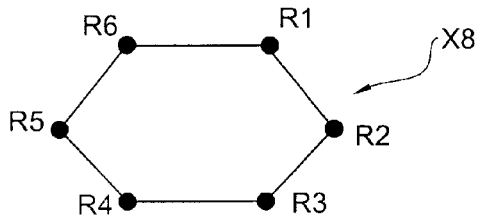

S = (6,(line-line, obtuse, convex, equal, zero, zero),
(line-line, obtuse, convex, equal, zero, zero),
(line-line, obtuse, convex, equal, zero, zero),
(line-line, obtuse, convex, equal, zero, zero),
(line-line, obtuse, convex, equal, zero, zero),
(line-line, obtuse, convex, equal, zero, zero))

FIG. 3h

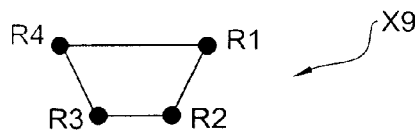

S = (4, (line-line, acute, convex, smaller, zero, zero),
(line-line, acute, convex, smaller, zero, zero),
(line-line, acute, convex, larger, zero, zero),
(line-line, acute, convex, larger, zero, zero))

FIG. 3i

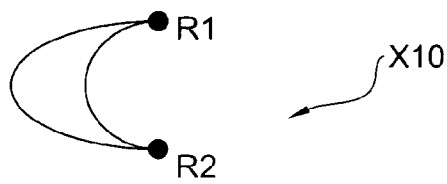

S = (2, (arc-arc, zero, zero, inward, flat),
(arc-arc, zero, zero, outward, sharp))

FIG. 3j

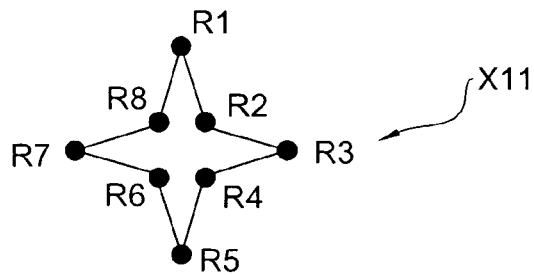

S = (8, (line-line, acute, convex, equal, zero, zero),
(line-line, obtuse, concave, smaller, zero, zero)
(line-line, acute, convex, equal, zero, zero),
(line-line, obtuse, concave, larger, zero, zero),
(line-line, acute, convex, equal, zero, zero),
(line-line, obtuse, concave, smaller, zero, zero),
(line-line, acute, convex, equal, zero, zero),
(line0line, obtuse, concave, larger, zero, zero))

FIG. 3k

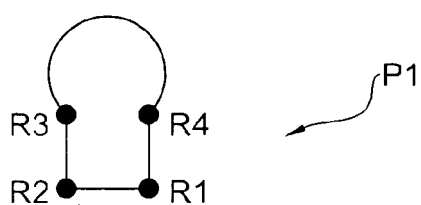

S = (4 (line-line, right, convex, equal, zero, zero, real),
(line-line, right, convex, equal, zero, zero, real),
(line-arc, right, convex, zero, outward, sharp, real),
(arc-line, right, convex, zero, zero, zero, imaginary))

FIG. 4

METHODS AND SYSTEMS FOR DEFINING, IDENTIFYING AND LEARNING GEOMETRIC FEATURES

This application claims the benefit of prior U.S. provisional patent application No. 60/846,091 filed Sep. 21, 2006, the contents of which are hereby incorporated by reference in their entirety.

FIELD OF THE INVENTION

This invention relates to methods and systems for defining, identifying and manipulating geometric features.

BACKGROUND OF THE INVENTION

Determination of geometric features of objects, for example of manufactured objects such as automotive metal parts, plastic parts and so on, or of natural objects, can be of great value in industry and elsewhere. Geometric features of manufactured objects that may be of interest may include the size, location and shape of edges, including bores, external edges and the like, for example. Often, such edges may conform to non-standard shapes, and are thus not subject to identification and/or classification by prior art methods.

By way of general background interest, U.S. Pat. No. 6,212,481 discloses an automatically shape calculating method and apparatus for contour shape measuring machines, by which a geometric shape value and a geometric shape boundary value are calculated from shape data. A geometric shape boundary is provisionally set in accordance with the shape data, which is obtained by measuring a workpiece, and then geometric shape calculation areas are set in areas except for the vicinities of the provisionally set point, a measurement starting point and a measurement ending point. A geometric shape value of the shape data is calculated while a geometric shape of the shape data is determined under geometric shape recognition conditions for each of the set geometric shape calculation areas. The geometric shape boundary value is calculated from the calculated geometric shape value, and the calculating results are output.

Also by way of general background interest, U.S. Pat. No. 5,434,803 discloses a coordinate measuring machine and the method of measuring therein wherein the instruction of the geometric shape is prevented from mistaking and the geometric shape of the workpiece is measured without interrupting the joystick operation. The measuring direction of the probe and the measured value of workpiece are taken in the data receiving part. The geometric shape calculation part calculates the errors of each geometric shape based on the measured value from the data receiving part and the formula which was input previously and represents the geometric shape such as "a straight line or circle".

SUMMARY OF THE INVENTION

In the present invention, the term "object" includes any two dimensional or three dimensional real object and/or virtual object, or a collection of two dimensional and/or three dimensional real and/or virtual objects, including a scene.

"Dimensional data" is taken herein to refer to any topographical data relating to a real object or to a virtual object, in particular data relating to location, orientation, size and/or shape with respect to surfaces or edges, including internal and external surface and edges, or other features of an object that are capable of being imaged or defined numerically (for example in case of CAD). By "virtual" is meant relating to and being manipulable within a computer environment or the like.

Thus, the object to be investigated, generally designated herein as o by way of example and with reference to the figures, according to the invention can refer to any mechanical or other object, real (physical) or virtual, including a scene, regarding which it is desired to determine, identify, learn, or otherwise manipulate dimensional data, such as for example edge data, thereof.

Herein, "edge" refers to a geometric shape boundary, in particular a one parametric curve of an object of 1 or 2 or 3 dimensional data. Namely, there is a one-to-one correspondence between a set of points along this edge and some segment.

For example, an edge may be regarded as the locus of the intersection between two non-parallel surfaces, the locus of the contact between two adjoining surfaces, or the boundary of a geometrical figure on a surface. Edges are commonly in the form of a discontinuity between the two adjoining or intersecting surfaces. In particular, in case of real objects, the physical external boundary of an object, the physical inner boundary of a hole, or a curve that separates adjacent surfaces in an object are examples of edges.

By "edge geometry" is generally meant the geometrical shape of the edge substantially independent of the scale and/or orientation and/or position of the edge, though optionally the edge geometry may also refer to the scale (or dimensions) and/or orientation and/or position of the edge with respect to any desired frame of reference.

The object O may comprise, for example, surfaces, edges and/or other features that may be substantially three-dimensional, for example as may be found in fabricated or virtual automotive parts such as relating to die-pressed door or body panels, for example. Alternatively the object O may comprise surfaces and edges that may be considered "two-dimensional", relating, for example, to a thin metal sheet having a particular plan form, which may be useful, for example, in quality control of the shape of blanks before being pressed in dies or the like. Of particular interest may be the location and/or size and/or shape of free edges, internal or external, bores, holes, bosses, journals, and so on.

In case of a virtual object which attempts to describe a physical object (for example its virtual image, its CAD model, its set of reconstructed 3D points, etc.) an example of an edge is the virtual subset of the virtual object that corresponds to the physical edge.

A "mathematical entity" herein refers to and includes any geometrical function, algebraic function, formula, virtual model or any other one dimensional representation or two dimensional (2D) representation or three dimensional (3D) representation or other representation, data set, and so on, that enables representation of a geometric feature, in particular a geometric edge, particularly, but not restricted to, in a computer environment. Furthermore, such a mathematical entity, or at least a part thereof, is capable of being defined by means of one or more attributes in a repeatable manner. Such reconstruction may be directed to reconstructing the entity so as to conform shape wise to said edge geometry but independent of the scale and/or orientation and/or position of the edge, or to conform geometrically in terms of shape and at least one of the scale, orientation and position of the edge.

"Attributes" herein refer to properties or characteristics of the mathematical entity or of at least a part thereof, each such attribute having a numerical or non-numerical value, wherein a particular set or array of attributes associated with the mathematical entity or part thereof provide sufficient information to repeatably describe the geometry of the mathematical entity or part thereof, respectively, either shape only and optionally dimensionally and/or regarding its spatial position and orientation with respect to datum frame of reference or axes. For example, where the mathematical entity comprises a pair of segments joined at a vertex, the attributes may include the shape of the segments, for example whether each has a value of "rectilinear" or "arc", and may further include the relative angular orientation between the two segments at the vertex, and this angular orientation may comprise, for example, a specific angle, or a values representative of particular angular ranges, for example acute, obtuse, reflex and right angle.

Herein, "segment" refers to a curve portion of any shape and bounded by two end points. Examples of segments include rectilinear curves (also referred to herein as "lines"), arcs (for example circular arcs, but may include elliptical arcs and arcs of any other known shape), or curves of any known shape in one, two or three dimensions.

According to a first aspect of the invention, a method is provided for defining an edge geometry of a geometrical feature, comprising:

(A) matching at least one mathematical entity with said edge geometry, wherein the or each said entity is capable of being embodied by a predetermined array of attributes having attribute values such that said array provides sufficient information to enable reconstruction of the corresponding said entity therefrom;

(B) for the or each said entity, generating a corresponding said array of attributes and applying to each said attribute thereof an attribute value chosen from a corresponding predetermined set of attribute values such that said array provides sufficient information to enable reconstruction of the corresponding said entity therefrom, and generating a text string based on said chosen array values whereby to define said edge geometry thereby.

According to one embodiment, the or each said mathematical entity comprises at least one vertex associated with at least two segments joined thereto such as to match said edge geometry according to predetermined criteria, and wherein said attributes are associated with at least shape-related information regarding said segments and at least one spatial relationship therebetween with respect to said corresponding vertex.

Optionally, the or each said vertex comprises two said segments joined thereto, and said array of attributes include at least one attribute chosen from the group consisting of number of vertices (NV), vertex type (VT), linear angle (LA), linear convexity (LC), linear size relation (LSR), curve convexity (CC), curve angularity (CA), and virtual segment (VS). The attributes of said group may have corresponding attribute values chosen from a corresponding set of attribute values as follows:

wherein NV corresponds to the number of vertices in the mathematical entity, and has an attribute value of a numerical integer corresponding to the number of vertices;

wherein said VT attribute corresponds to the general shape of the segments joined to the vertex V, and has an attribute value chosen from a said predetermined set of attribute values including: "undefined", "Line-Line", "Line-Arc", "Arc-Line", "Arc-Arc", wherein the sub values Arc and Line refer to at least one or another of said two corresponding segments being one of a nominally rectilinear line and an arc;

wherein said LA attribute corresponds to an angular relationship at a vertex between two corresponding said segments, and has an attribute value chosen from a said predetermined set of attribute values including: "undefined", "Acute", "Right", "Obtuse", wherein the angular relationship is respectively unimportant, less than about 90 degrees, nominally 90 degrees and more than 90 degrees;

wherein said LC attribute corresponds to a relative spatial relationship between a corresponding said vertex and two other said vertices immediately adjacent thereto, and has an attribute value chosen from a said predetermined set of attribute values including: "undefined", "Convex", "Concave", wherein the spatial relationship is respectively unimportant, the said corresponding vertex lies on a first side of an imaginary line joining said adjacent vertices, or the said corresponding vertex lies on a second, opposed side of said imaginary line;

wherein said LSR attribute corresponds to a relative size relationship between a first said segment and a second said segment joined to said vertex, and has an attribute value chosen from a said predetermined set of attribute values including: "undefined", "larger", "Equal", "Smaller" wherein the size relationship is respectively unimportant, said first segment is larger than said second segment, said first segment is nominally the same size as said second segment, said first segment is smaller than said second segment;

wherein said CC attribute corresponds to a relative spatial relationship between a said segment, said corresponding vertex and an adjacent vertex also joined to said segment, and has an attribute value chosen from a said predetermined set of attribute values including: "undefined", "Outward", "Inward", wherein respectively the segment is a rectilinear curve, the segment is an arc and lies on a first side of an imaginary line joining said adjacent vertices, or the segment is an arc and lies on a second, opposed side of said imaginary line;

wherein said CA attribute corresponds to an angular extent of a said segment, between said corresponding vertex and an adjacent vertex also joined to said segment, and has an attribute value chosen from a said predetermined set of attribute values including: "undefined", "Zero", "Semicircle", "Sharp", "Flat", wherein respectively the angular extent is unimportant, the segment is a rectilinear curve, the segment is an arc of angular length nominally 180 degrees, the segment is an arc of angular length substantially greater than 180 degrees, the segment is an arc of angular length substantially less than 180 degrees;

wherein said VS attribute corresponds to the nature of the segment following the vertex and has an attribute value chosen from a said predetermined set of attribute values including: "Undefined", "Real", "Imaginary", wherein respectively the real or imaginary nature of the segment is unimportant, the segment is real, or the segment is imaginary.

Optionally, for at least one said entity, at least one said attribute corresponding thereto comprises a corresponding attribute value that is substantially invariant with respect to a dimension and orientation of said entity.

Optionally, the or each said mathematical entity may be matched to said edge such that the or each said vertex thereof corresponds to an identifiable point on or close to said edge, and that said corresponding segments joined to the vertex are each of a shape similar to a shape of a corresponding edge portion of said edge on corresponding sides of said identifiable point, wherein said shape similarity between at least one said segment and its corresponding said edge portion is substantially independent of possible differences therebetween in at least one of scale, orientation and position.

Optionally, said entity comprises a plurality of said vertices, cyclically joined to one another via corresponding said segments, such that each pair of adjacent said vertices is joined by a said segment, and wherein said array further comprises a said attribute having an attribute value corresponding to the number of said vertices constituting said plurality of vertices.

Optionally said edge geometry constitutes a closed edge. Alternatively, said edge geometry comprises a first free end and a second free end, and wherein said entity comprises an imaginary said segment joining a vertex corresponding to said first free end with a said vertex corresponding to said second free end.

The or each said mathematical entity may be matched to said edge such that the or each said vertex corresponds to an identifiable point on said edge, and that said corresponding segments joined to the vertex are each of a shape similar to a shape of a corresponding edge portion of said edge on corresponding sides of said identifiable point, wherein said similarity between at least one said segment its said corresponding edge portion is substantially independent of differences therebetween in at least one of scale, orientation and position.

According to second aspect of the invention, a method is provided for identifying an edge geometry of a geometrical feature, comprising:

(a) defining said edge geometry to provide a text string according to method of the first aspect of the invention including any variation or feature thereof as disclosed herein;

(b) comparing said text string in step (a) with library text strings of a text string library, each said library text string corresponding to a known library mathematical entity; (c) identifying a said library entity having a corresponding said library text string that best matches said text string defined in step (a) according to predetermined criteria.

For example, said edge geometry constitutes a closed edge, or alternatively the edge geometry comprises a first free end and a second free end, and wherein said entity comprises an imaginary said segment joining a vertex corresponding to said first free end with a said vertex corresponding to said second free end.

If no match is found in step (c), the method may further comprise the step of:

(d) including said text string of step (a) in said text string library and associating an identification label with the entity corresponding thereto.

In step (b) said text string may be compared with each said library text string in a cyclic manner, starting at any desired part of said text string, and along any desired direction with respect to the text string.

According to third aspect of the invention, a method is provided for extending a library associated with edge geometries, comprising:

(i) providing an edge geometry;

(ii) defining said edge geometry to provide a text string according to the method of the first aspect of the invention including any variation or feature thereof as disclosed herein;

(iii) comparing said text string in step (ii) with library text strings of said text string library, each said library text string corresponding to a known library mathematical entity;

(iv) if said text string defined in step (ii) does not match a said library text string according to predetermined criteria, including said text string of step (ii) in said text string library and associating an identification label with the edge geometry corresponding to said text string defined in step (ii).

In step (iii) said text string may be compared with each said library text string in a cyclic manner, starting at any desired part of said text string, and along any desired direction with respect to the text string.

The present invention also relates to providing a computer readable medium embodying in a tangible manner a program executable for carrying out the method according to the first aspect of the invention including any variation or feature thereof as disclosed herein, wherein the computer readable medium comprises:

a first set of data representative of said geometric edge;

a second set of data representative of said at least one mathematical entity;

means for matching at least a portion of said first set of data with at least a portion of said second set of data; and means for generating said text string from said portion of said second data set that is matched with said portion of said first data set.

The medium may comprise, for example, any one of optical discs, magnetic discs, magnetic tapes, and the like.

The present invention also relates to providing a computer readable medium embodying in a tangible manner a program executable for carrying out the method according to the second aspect of the invention including any variation or feature thereof as disclosed herein, wherein the computer readable medium comprises:

a first set of data representative of said edge;

a second set of data representative of said library text strings;

means for comparing at least a portion of said first set of data with at least a portion of said second set of data; and means for identifying data in said second data set corresponding to said portion of said first set of data when a match therebetween is found.

The medium may comprise, for example, any one of optical discs, magnetic discs, magnetic tapes, and the like.

The present invention also relates to providing a computer readable medium embodying in a tangible manner a program executable for carrying out the method according to the third aspect of the invention including any variation or feature thereof as disclosed herein, wherein the computer readable medium comprises:

a first set of data representative of said edge;

a second set of data representative of said library text strings;

means for comparing at least a portion of said first set of data with at least a portion of said second set of data; and means for storing in said edge library said portion of said first set of data when no match with said second set of data may be found.

The medium may comprise, for example, any one of optical discs, magnetic discs, magnetic tapes, and the like.

The present invention also relates to providing a system for defining an edge geometry of a geometrical feature, comprising:

an input device for inputting a virtual model corresponding to at least an edge geometry of a geometrical feature;

computer processor configured for implementing the method according to the first aspect of the invention including any variation or feature thereof as disclosed herein;

an output device for outputting said text string generated in step (B).

The computer processor may be further configured for implementing a method according to the second aspect of the invention including any variation or feature thereof as disclosed herein, wherein said library is stored in a suitable memory, and wherein said output device is configured for outputting said library entity identified in step (c).

The computer processor may be further configured for implementing a method according to the third aspect of the invention including any variation or feature thereof as disclosed herein, wherein said library is stored in a suitable memory, and said computer is configured for storing said text string of step (ii) in said memory and associating an identification label with the edge geometry corresponding thereto.

The aforesaid geometric feature may be a real feature, and the method may further include the step of reconstructing said geometrical feature in virtual space using any suitable reconstruction technique based on imaging said real geometric feature. Alternatively, the geometric feature may be a virtual feature suitably obtained from a virtual model.

Optionally, step (A) is performed with respect to at least one criteria within predetermined threshold associated therewith. Optionally, said criteria is a linear deviation, said threshold relating to a maximum said deviation between corresponding parts of said entity and said at least a portion of said edge geometry.

Optionally, step (B) comprises first comparing a part of said text string corresponding with a said attribute relating to a number of said vertices with a corresponding part of said library text strings.

Optionally, the or each said mathematical entity comprises at least one two-variable curve, said two variables being related by a mathematical formula of predetermined form including parameters characterizing said formula, wherein said attributes are associated with said form, and with said parameters.

Optionally, the mathematical entity may be used to check, measure or obtain dimensional data of the edge geometry.

Thus, according to some aspects of the invention, a qualitative shape description is provided for a geometric feature (GF) of a complex shape, that allows recognition of the complex shape by matching it against a database comprising a list of existing or known GF types.

Another usage of such a description is to learn a new type of a complex shape which does not match any (if at all) existing predefined shapes. Once this new shape has been learned, it can be added to the list of shapes for future recognition.

According to aspects of the invention, such a description may optionally be invariant to one or more of translation, rotation and scaling. Moreover, the description may also be optionally invariant to relative changes in shape dimensions (like lengths of edge segments or angles between adjacent segments, for example) that keep the same overall shape. Optionally, the description of the general feature may be supplemented by actual dimensions ("nominal") for measurement purposes.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 3a to 3k illustrates various implementations of step 130 of the embodiment of FIG. 1 relating to a closed edge.

FIG. 4 illustrates an implementations of step 130 of the embodiment of FIG. 1 relating to an open edge.

DETAILED DESCRIPTION OF EMBODIMENTS

Figure 1:
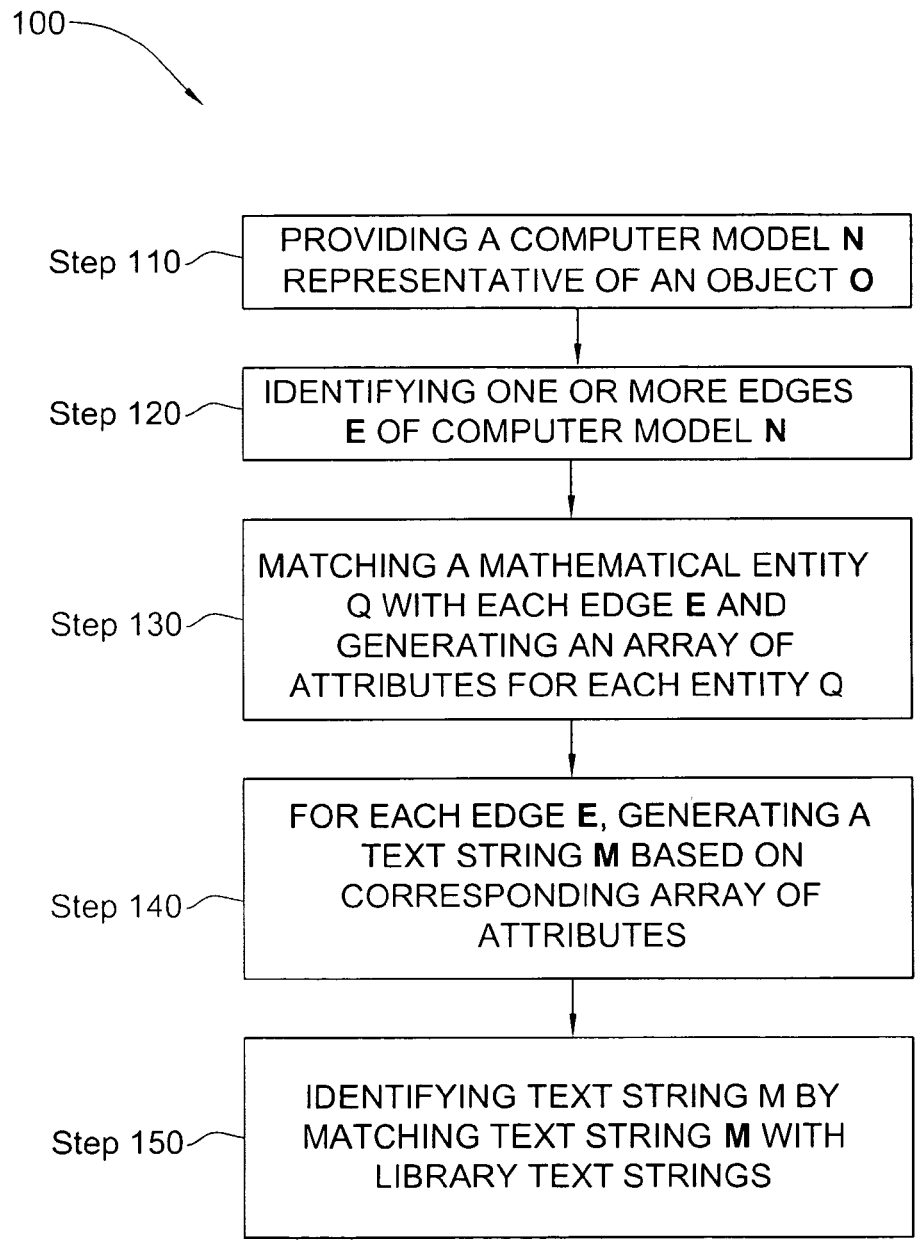
FIG. 1 is a schematic illustration of method steps according to some aspects of the invention.

According to a first aspect of the invention, a method and system are provided for defining a geometrical edge that is characteristic of, embodies, or is otherwise part of, a geometric feature of an object. FIG. 1 illustrates steps according to a first embodiment of such a method, generally designated with the numeral 100. In step 110, a manipulable computer model N is provided representative of object O, or at least of the geometrical feature of interest thereof, in the virtual environment of a computer, the computer model N thus comprising the virtual equivalent of at least said geometrical feature of interest.

In cases where the object O is a CAD model or other virtual model, this model may comprise the aforesaid computer model N. A computer model N is a virtual model or any other two dimensional (2D) or three dimensional (3D) representation, data set, and so on, or any other numerical or other model, that enables representation of the object O in a computer environment, and comprising the virtual equivalent of at least one geometrical feature regarding which dimensional and/or other topographical data relating thereto may be obtained, and/or may be manipulated in any desired manner within the computer environment.

Alternatively, when the object O is a real (i.e., a physical) object, a virtual or other computer model N representative of the object may be generated by any suitable means, which may include, by way of example, optically-based or contact-based systems. Contact-based systems may include, for example, a probe or other detector having a contact tip that is passed over the surface of the object in contact therewith, and the three-dimensional (3D) coordinates corresponding to the spatial location of the probe tip are recorded at intervals, thereby constructing a 3D map of the surface.

Figure 2:
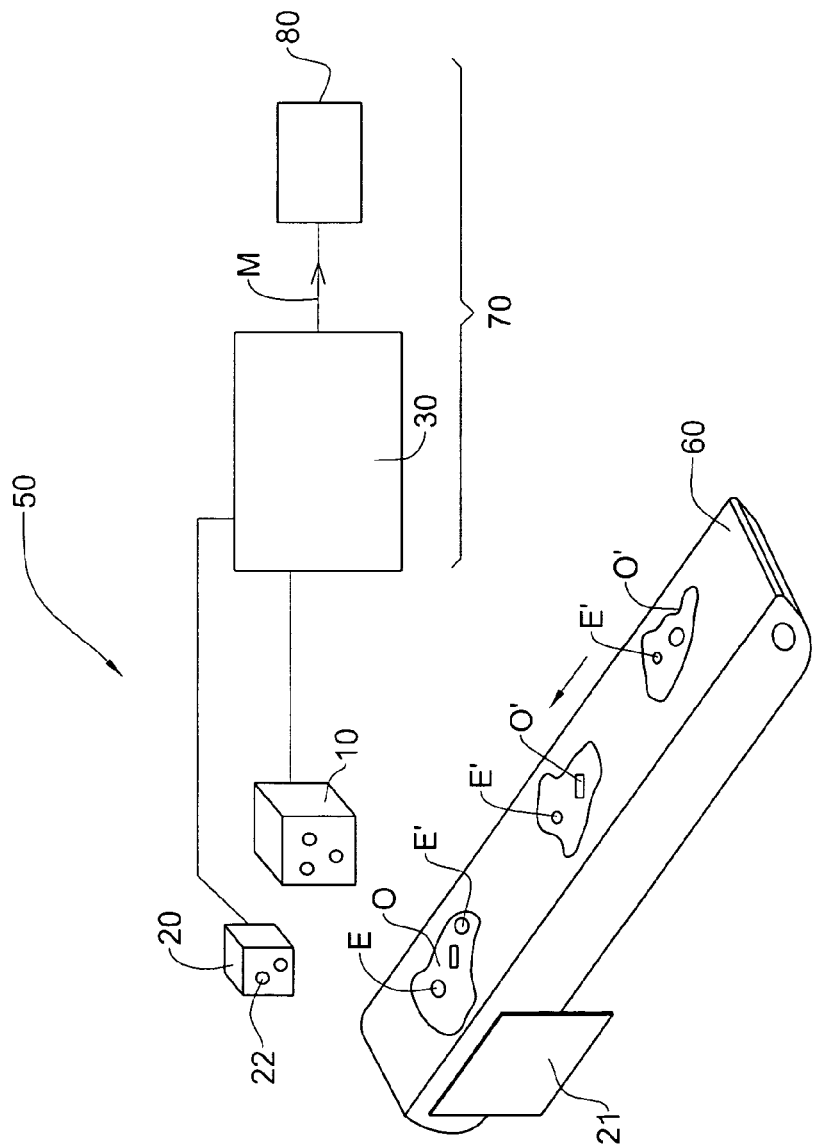
FIG. 2 is a schematic illustration of a system for obtaining and manipulating dimensional data of an object according to one embodiment of the invention.

Referring to FIG. 2, in one embodiment of an optically-based system, designated 50, that may be used for generating said computer model N, may include, for example, a suitable optical head 10, an illumination system 20, and a controller 30. The optical head 10 may comprise one or more suitable imaging devices or systems, typically one or more suitable cameras, including for example a video camera or any CCD-based or CMOS-based camera, which can transmit an image electronically to the controller 30. The controller 30 may comprise a suitable microprocessor means such as a suitable computer via an image grabber, for example. In particular, each image capturing device may be configured for providing image data from a real object O being imaged, such as to enable the surface topography or other dimensional data, relating to for example location and shape of geometrical features such as for example recesses or protrusions, to be determined from the image data, via the controller 30 or any other suitable microprocessor. Accordingly, and by way of non-limiting example, the image capturing device may provide such image data on which epipolar, triangulation or any other known image reconstruction techniques may be applied to determine corresponding surface topography or other dimensional data of the object.

The illumination system 20 may include any suitable illumination system, for example a static global illumination system for illuminating the full object, or an arrangement of lights fixed onto and carried by the camera head for illuminating the particular area of the object that is being imaged by the camera. Optionally, the illumination unit 20 may comprise a light reflecting medium 21 and an illumination source 22, and the object O may be placed in front of the medium 21 and arranged such that it is located between the medium 21 and the illumination source 22, and also between medium 21 and the image capturing device. In particular, the illumination source 22 may be spatially arranged with respect to the real object O and medium 21, such that, at least during operation of the system 50, the real object O, or at least a region of interest (ROI) comprising a portion of the surface thereof comprising the geometric feature having internal and/or external edges, and a part of the medium 21 surrounding the object's edges are illuminated by the source 22. The light reflecting medium 21 may optionally be characterized in having a high reflectivity or gain, particularly relative to the reflectivity or gain of the real object O, in particular the part of the surface thereof including the aforementioned edges. In some embodiments, the medium 21 may comprise a suitable retro-reflective surface. A "retro-reflective surface" herein refers to a surface which bounces incident light back towards the source of the light, in other words, a light beam that has a certain incidence angle with respect to the layer will exit the layer at approximately the same angle back to the illumination source. Such retro-reflective surfaces are well known and may be formed, for example, using spherical reflective beads, or the like, and compositions of retro-reflective layers and methods for their production are disclosed in U.S. Pat. Nos. 2,432,928, 2,440,584, 2,543,800, 2,397,702, 4,104,102, for example, the contents of which are incorporated herein in their entirety by reference. Retro-reflective surfaces typically provide a gain of more than 2.

Having provided a computer model N, in the next step 120 one or more edges E of the geometrical feature of interest thereof are identified. The edges E may be external edges or internal edges with respect to the object O, and may have any shape, which may be one-dimensional, two dimensional or three dimensional. The edges E may be identified using any one of a number of well known techniques in the art, including, for example classical 2D edge detection algorithms for 2D images, or CAD internal queries or using flood algorithms in case of point cloud search for edges, for example, or may be chosen manually or in any other suitable manner.

In step 130, the form of each edge E is analyzed and at least one mathematical entity Q is matched thereto, at least in terms of shape only, i.e., independently of any possible differences in the scale and/or orientation and/or position of the edge E with respect to the entity Q, and a set or array of attributes is generated that embodies the mathematical function Q.

In step 140, to the mathematical entity Q is assigned a name or text string M, according to a predetermined nomenclature, criteria, language and so on, based on the values of an array of attributes of the mathematical entity Q, as will be described in greater detail herein.

According to some aspects of the invention, the text string M comprises identifiable and manipulable alphanumerical characters and/or symbols, according to any alphabet system, and so on, that define or otherwise embody the form of the edge E, at least in terms of shape only, and optionally also in terms of the scale and/or orientation and/or position of the edge E, and thus are based or otherwise include suitable attributes or other characteristics of the matched virtual model Q. The analysis of the edge E and the choosing of a suitable mathematical model Q for matching thereto may be based on geometrical methods and/or algebraic methods and/or trigonometric methods, and/or on any other mathematical methods, numerical methods, or comparative methods that enable the form of the edge E to be represented in a concise and repeatable manner by the mathematical entity Q, at least in terms of shape. A number of non-limiting examples will now be presented for defining the text string M corresponding to the mathematical entity which is matched with an edge E.

EXAMPLE 1

If an edge E may be approximated (within a predetermined level of tolerance) to, and thus matched with, a mathematical entity Q in the form of mathematical function, for example an algebraic function, which may include for example a polynomial curve, then the array of attributes thereof may comprise a series of characters, including a leading set of characters that serves to identify the curve as a polynomial curve having a known number of constants and variables (for example according to a code, or to a look up table, or in any other suitable manner), and a second set of characters that provides the coefficients of each the polynomial terms and the constant, the characters optionally being separated by commas, periods, or other specific characters that may be designated for separating. Thus, in case of a 2D ellipse, if the polynomial that is matched to and thus describes edge E is $$2X^2+4Y^2-6=0 \quad (1)$$

this may be considered to be a polynomial of the general form: —

$$aX^2+bXY+cY^2+d=0 \quad (2)$$

and the text string M may comprise the said array having been assigned the appropriate array values, for example: (poly, $2^{nd}$, two; 2, 0, 4, −6). In such a case, the leading set of characters/symbols "poly, $2^{nd}$, two" are attribute values corresponding to the attributes respectively referring to the edge being represented by a polynomial, of second degree, and having two independent variables. The second set of characters/symbols "2, 0, 4, −6" are attribute values that refer to the attributes including coefficients and the constant of the terms in the standard $2^{nd}$ order polynomial having two independent variables, as per equation (2) above. The two sets of characters/symbols may be separated by a particular character or symbol used exclusively for this purpose, for example a semicolon ";".

Similarly, if the edge E may be defined and thus matched by a different type of mathematical function, for example another algebraic function, or trigonometric or geometrical functions, then the text string M may be constructed such as to based on the values of attributes including an identification of the function, and for example the minimum number of parameter values associated with that function such that the precise form of the function, and thus the curve, may be defined and optionally recreated, at least in terms of shape only and optionally also in terms of the scale and/or orientation and/or position.

In practice, a particular edge E may sometimes be exactly described and thus matched by a particular mathematical function, or may be approximated thereto by a particular function, within a desired or acceptable level of tolerance. For example, and in the latter case, if the edge E is comprised of a series of points in a Cartesian coordinate system, the method may utilize a least squares technique, for example, for determining which type of mathematical function, out of a library of functions, say, best fits the points, and then a further check can be made as to the deviation of the actual points from the chosen curve. If the level of deviation is within a preset tolerance, the mathematical function is accepted, and the corresponding text string M formulated according to the particular rules used to enable identification of the attributes thereof and the corresponding attribute values. On the other hand, if the deviation is higher than the tolerance, the function may be rejected, and a different way of describing and matching the edge, and subsequently naming the edge is attempted, for example using a different mathematical function, optionally as set out in the examples below. The threshold of tolerance may be set to be the same for all mathematical functions used, or may vary from function to function, for example.

EXAMPLE 2

There may be cases where a particular edge geometry cannot be usefully or practically described by a single mathematical function, at least within a desired accuracy threshold, and it may be more beneficial to divide or segment the edge into a number of smaller segments or portions, each of which is considered a separate edge E and is described and matched by a particular mathematical function. For example each portion may be matched in a similar manner to the edge as described in Example 1, mutatis mutandis. In such a case, the text string corresponding to the original edge may be provided as a series of text strings M, each such text string M in the series corresponding to a particular edge E of the corresponding portion as above, mutatis mutandis, and arranged for example in the same sequence as the portions are arranged in the original edge. In addition, each text string may further comprise one or more additional parameters that set the end point conditions between adjacent edges E. For example, such a parameter may be the length of a Spline of a segment, as defined under the particular name of the text string of the segment. Alternatively, any parameterization of the segment curve may be used for its text string M.

Optionally, rules may be applied at the interface between the mathematical functions matched to edges E to ensure smoothness of the transition between one function and the next, where appropriate. For example, if the original edge being investigated does not contain discontinuities or "kinks", the mathematical functions may be chosen for each of the individual edges E such as to minimize the variation of the second or third differentials of the functions at these interfaces.

The manner in which an edge may be divided into a series of smaller edges E or portions may vary from application to application of the invention, and any suitable method for so doing may be employed. For example, and depending on the form of the data comprising the original edge, a first differential or second differential may be calculated along the edge, and places where there is a sharp change identified as interfaces between segments. In some cases, for example in CAD representation of an object, the division into segments can be obtained by using CAD internal queries that are programmed to divide the edge into portions according to internal curve representation.

Optionally, the same tolerance threshold for matching functions to each of the edges E may be set. Alternatively different tolerance levels may be set, for example such that the overall deviation is within a global tolerance for the edge.

Alternatively, where the edges E may be represented by polynomial representations, for example as disclosed above, it is possible to use mathematical characteristics of the curve which are invariant to rotation and translation, instead of the curve coefficients, mutatis mutandis.

For example, in case of a mathematical function describing and matching the edge E being in quadratic form (2D curve of degree 2, or 3D surface of degree 2) the algebraic signature that is derived from an appropriate determinant and trace of 2-by-2 matrices determine if the curve is an ellipse, circle, hyperbola, etc. The curvature of a curve is also an invariant geometrical property (curvature zero for a line, constant curvature for a circular arc etc.). Thus, it is possible for the text string M to include a symbol and/or characters that denote the type of curve, for example "para" for parabola, irrespective of the orientation of the parabola in 3 space.

EXAMPLE 3

In this example, the edge E is represented, and thus matched, by a mathematical entity Q comprising a plurality of discrete segments, serially joined at "real" vertices $V_{-1} \ldots V_{-n}$ where vertex $V_{-i}$ has coordinates $(X_{-i}, Y_{-i})$, wherein the series of segments and vertices together match the edge E at least in terms of shape only and optionally also in terms of the scale and/or orientation and/or position. The edge E may be the complete edge being investigated, or a part thereof in which case the complete edge may be represented by a plurality of such edges E serially or otherwise joined to one another. According to one aspect of the invention, the segments are primitive elements such as for example straight lines, arcs and the like, which are simple shapes clearly and easily distinguishable one from another. It is to be noted that this form of mathematical function Q allows practically any edge to be matched, by choosing an appropriately large number of segments (each of appropriate size and shape) and vertices to follow the shape of the edge, for example. On the other hand, less complex edges, or complex edges where nevertheless a plurality of portions thereof may be straightforwardly matched by simple segments such as rectilinear lines or arcs, may require less segments and vertices to match the edge. The precise number and form of vertices and segments are chosen to best fit the shape, and optionally also one or more of scale, orientation and position, of the edge. For example, the vertices may be chosen to fit on the edge at positions which are identifiable and correspond to changes in the direction of the edge, such as for example corners.

While this example may be of particular use when all the vertices are in the same plane in 3D space, it may be extended to cases in which the vertices are not in the same plane in 3D space, mutatis mutandis. Further, while in the examples described herein in detail refer to each vertex having two segments joined thereto, the present invention is applicable, mutatis mutandis, to edges which may be represented by at least one vertex having a plurality of segments joined thereto, including 3, 4 or more segments joined top the vertex.

Further, the segments may each conform to known one dimensional or two dimensional shapes, such as for example rectilinear lines, curved lines lying on a plane including for example circles or parts thereof, or other known arcs. Optionally, segments of different parts of the edge E may be co-planar, or lie along parallel planes, or may lie along non-parallel or intersecting planes. Alternatively, the segments may conform to three-dimensional shapes, mutatis mutandis.

For non-rectilinear segments, such as arcs for example, an "imaginary" vertex may optionally be introduced, which is a point lying on the arc. An imaginary vertex may serve as an indication that the particular vertex is associated with an arc, and also serves to define the arc itself, together with its two "real" neighboring vertices at the opposed ends of the arc.

An arc's imaginary vertex $V_i$ may be described by a set of three parameters $\{X_i, Y_i, C_i\}$, where:
- $\{X_i, Y_i\}$ are coordinates of the vertex $V_i$
- $C_i$ is a Boolean (True/False) variable, which may be assigned the True value if a vertex $V_i$ is "real", and the False value if the vertex $V_i$ is "imaginary"

The inventor has found that this format for representing curves and real vertices is compact and convenient. It may serve as an intermediary format when extracting a shape from a CAD model, for example.

In describing the shape of the edge E, the vertices V may be numbered (for identification) in a sequential, cyclic manner, and the path from $V_1$ to $V_n$ may be defined in a clockwise direction, for example. If these conditions for a particular edge E do not hold, a preprocessing step may be applied, wherein, for example:

Redundant vertices may be removed in cases such as:
  A real vertex connecting two co-linear segments.
  A gap exists between two neighboring real vertices, where the dimensional magnitude of the gap falls below a pre-defined tolerance.
  A real vertex connecting the ends of two arcs, where the arcs are of similar radius and their centers are close
The remaining Vertices are then re-sorted sequentially and in the clockwise sense, as before.

Identification of the vertices V provides what is referred to herein as an intermediate format for the edge E.

Next, the text string M for the mathematical entity Q that is matched to an edge E may be created by applying various rules to the vertices provided in the intermediate format. These rules may serve to provide a "language" where each text string M thus obtained is a description of a particular unique shape of an edge. Such a language is referred to herein as a High level Feature Description Language (HFDL). HFDL may describe the shape of an edge by a set of text strings or "words" for each of its "real" vertices. While the mathematical entity Q comprises a plurality of vertices and segments, the entity may be defined by means of an array of attributes relating to characteristics of the each of vertices with respect to the shape and/or relative disposition of the segments joined thereto.

In the aforementioned HFDL, a "word" or text string M for each real vertex $V_j$ may be coded by means of the following array of attributes: $V_j=(NV_j, VT_j, LA_j, LC_j, LSR_j, CC_j, CA_j, VS_j)$, wherein to the attributes may be applied attribute values as follows, for example:

$NV_j$ is an attribute corresponding to the number of vertices in the mathematical entity Q, and has an attribute value of a numerical integer corresponding to the number of vertices;

$VT_j$ is a "Vertex Type" attribute and describes the type of neighboring segments the vertex is associated with. Its value depends on whether the neighboring segments, i.e., the segment immediately before the vertex, i.e., $V_{j-1}-V_j$ and the segment immediately after the vertex (looked at in the cyclic manner discussed above), $V_j-V_{j+1}$ are line or arc segments. The $VT_j$ attribute value may be "undefined", i.e., where one or both neighboring segments are neither rectilinear lines or arcs, or alternatively, "undefined" is taken to mean that the value of this attribute is not considered important for the particular vertex $V_j$. Alternatively, the $VT_j$ attribute may have a value according to whether one or both neighboring segments are rectilinear lines or arcs, and thus may belong to the set, and wherein:
  {Undefined, Line-Line, Line-Arc, Arc-Line, Arc-Arc}

$LA_j$ is a "Linear Angle" attribute, and it describes the relative angle between the neighboring segments, i.e., the segments preceding and following the vertex, $V_{j-1}-V_j$ and $V_j-V_{j+1}$. The LAj attribute value may be undefined if it is not considered important for the particular vertex $V_j$, or may be assigned an attribute value of "acute" if the angle is less than 90 degrees or $\pi/2$ radians, an attribute value of "right" is the angle is nominally 90 degrees or $\pi/2$ radians, or an attribute value of "obtuse" if the angle is greater than 90 degrees or $\pi/2$ radians, and thus the attribute value belongs to the set:
  {Undefined, Acute, Right, Obtuse}

$LC_j$ is a "Linear Convexity" attribute and serves to describe the relative spatial position of a vertex $V_j$ with respect to its two neighboring vertices. This attribute has a value defined as "Convex" if the vertex in question $V_j$ lies on the left side of the oriented line, i.e., an imaginary straight line joining the neighboring vertices $V_{j-1}-V_{j+1}$, or an attribute value of "Concave" if the opposite is true, or undefined if not considered important for the particular vertex $V_j$. The $LC_j$ value thus belongs to the set:
  {Undefined, Convex, Concave}

$LSR_j$ is a "Linear Size Relation" attribute and refers to the relative sizes of the neighboring segments with respect to the vertex $V_j$. Thus the value of this attribute is "undefined" if not considered important for the particular vertex, or the attribute value is "Larger" if the next segment ($V_j-V_{j+1}$) after the vertex $V_j$ is larger than the previous segment ($V_{j-1}-V_j$), and may be "Equal" or "Smaller" if the next segment is nominally the same size or substantially smaller, respectively, than the previous segment. The $LSR_j$ attribute value may thus belongs to the set:
  {Undefined, Larger, Smaller, Equal}

$CC_j$ is a "Curve Convexity" attribute and serves to describe the shape and relative spatial position of next segment after the vertex $V_j$ with respect to this vertex and a neighboring (next) vertex $V_{j+1}$. The value of this attribute is "Undefined" if the next segment after the vertex V, i.e. segment $V_j-V_{j+1}$ is a rectilinear line or if the attribute value is not important for the particular vertex $V_j$. If the next segment $V_j-V_{j+1}$ is an arc, then $CC_j$ value is "Outward" if the arc lies on the left side of the oriented chord, i.e., an imaginary straight line joining the vertex $V_j$ with its subsequent neighboring vertex $V_{j+1}$, and "Inward" if the opposite is true. The $CC_j$ attribute value may thus belong to the set:
  {Undefined, Outward, Inward}

$CA_j$ is a "Curve Angularity" attribute and serves to describe angular extent of a curved segment $V_j-V_{j+1}$ that follows a vertex $V_j$. The attribute has a value of "Undefined" if not important for the particular vertex $V_j$, an attribute value of "zero" if the segment $V_j-V_{j+1}$ is a rectilinear line, or a value of a "Semicircle" if the segment $V_j-V_{j+1}$ is an arc of angular length 180 degrees or $\pi$ radians, or a value of "Sharp" if the segment is an arc of length greater than 180 degrees or $\pi$ radians, or a value of "Flat" if the segment is an arc of angular length less than 180 degrees or $\pi$ radians. The $CA_j$ attribute value may thus belong to the set:
  {Undefined, Zero, Semicircle, Sharp, Flat}

$VS_j$ is a "virtual segment" attribute, typically used only with respect to open edges, i.e., edges that are not closed, though may also be used with closed edges, and serves to identify the segment $V_j-V_{j+1}$ that follows a vertex $V_j$ as being a real segment or an imaginary segment. The attribute has a value of "Undefined" if the attribute is not important for the particular vertex $V_j$, an attribute value of "real" if the next segment $V_j-V_{j+1}$ is a real segment, or a value of "imaginary" if the next segment $V_j-V_{j+1}$ is an imaginary segment used for the purpose of closing the open ended edge. The $VS_j$ attribute value may thus belong to the set:

{Undefined, Real, Imaginary}

There may be special cases of the geometric feature when this is itself a primitive element, for example a circle, which is the special case of a closed shape with one segment only. In such a case, the circle may be divided into two segments each consisting of a semi-circles, with two vertices joining the semicircles.

Another special case of a geometric feature may include an open ended edge, i.e., that is not a closed shape, and this may be defined using the HFDL by connecting the two end points of the edge by an imaginary segment, wherein the imaginary segment is treated in the same manner as the other segments. In such a case, a further attribute VS may be added to the array of attributes relating to whether a segment is real or imaginary.

An HFDL description for the shape of the edge E, i.e. the text string M for the mathematical entity Q corresponding thereto, may be provided as a "sentence" $(n, W_1 \ldots W_n)$, where n is the number of vertices and $W_1 \ldots W_n$ are the words or text strings corresponding to the attribute values of the attributes of each of shape's "real" vertices, and which thus describe the same. A number of examples of closed edges defined in HFDL are presented in FIGS. 3a to 3k, in which a number of examples of numerical entities X1 to X11 are respectively illustrated, each having a number of vertices marked R followed by an integer, together with a corresponding said text string designated as "S", corresponding to the attribute NVj, followed by an array of attribute values for each vertex corresponding to attributes $(VT_j, LA_j, LC_j, LSR_j, CC_j, CA_j)$. An example of an open edge is presented in FIG. 4, in which the numerical entity P1 is illustrated having a four vertices marked R1 to R4, together with a corresponding said text string designated as "S", corresponding to the attribute NVj, followed by an array of attribute values for each vertex corresponding to attributes $(VT_j, LA_j, LC_j, LSR_j, CC_j, CA_j, VS_j)$, wherein the segment between vertices R1 and R4 is an imaginary segment.

Extraction of an edge E from a computer model N such as a CAD model, for example, may be done either automatically or by user picking a point at the CAD surface near the features edge. A query is sent to CAD to bring the edge point nearest to the pick point. It is verified that the edge point belongs to a real edge, and not to an inner stitch edge. If that is not the case, the CAD is asked for another edge point. Then an iterative process is started, where queries are sent to CAD to bring edge segment that contain the given edge point. At each step, the obtained segment is verified to belong to a "real" edge, and a new segment is looked for in the neighborhood of the previous segment's edge points. Each obtained segment is checked for linearity. This results in the identification of a set of vertices, including "real" and "imaginary" vertices, that describes the chosen shape in an intermediary format. In the wholly automatic process, "virtual" picks are done automatically across a grid.

Once the edge geometry E has been defined in terms of text string M, the latter may be easily manipulated in a computer environment for various uses.

For example, according to one aspect of the invention, and referring again to FIG. 1, a method is provided for identifying an edge geometry, comprising defining the edge E in terms of text string M, and thus including steps 110 to 140 as described above, mutatis mutandis. In addition, identification step 150 is executed after step 140.

In step 150, the edge geometry of the geometric feature may be identified by comparing the text string, defined with respect thereto, with a library of text strings until a suitable match is found. The text string being investigated and the library text string with which it is compared are derived from the same form of mathematical entity Q.

Accordingly, it may sometime be useful in step 130 to match more than one mathematical entity to the edge geometry, for example a polynomial curve, for example according to Example 1 or 2 above, and also a plurality of vertices and segments according to Example 3 above, so that two different text strings may be generated for the same edge geometry, each of which may be compared with a different but compatible library of text strings. Matching more than one mathematical entity for an edge geometry may also be desired even in the absence of step 150, when executing only steps 110 to 140, i.e., when executing a method according to the invention for defining an edge geometry, wherein the edge geometry is thus separately defined by a number of different text strings.

Such library text strings each relate to a particular edge geometry and may be previously created in any suitable manner.

In one application of step 150, having assigned a text string M to a particular edge E, which may now be referred to as a datum edge or datum feature, the text string M may now be used in a number of different ways. For example, it may be desired to identify and locate other edges in the same object O having the same characteristics as those of a particular edge E. Alternatively, it may be desired to identify and locate similar edges to edge E in other objects which themselves may be similar to or different from object O. In the latter case, and referring again to FIG. 2, a conveyor 60 may be used, for example, for automatically presenting each object, in turn, to the system 50, so that the edges thereof may be identified and analyzed, and compared with that of a datum shape E, which has been previously "learned" from object O, for example according to the method described herein with respect to FIG. 5, mutatis mutandis.

Referring to the former case, where it may be desired to locate other edges in the object O having characteristics similar to those of the edge E, the full object O may be analyzed to identify all the edges thereof, or alternatively a part of the object O may be analysed to identify edges that may be found in a particular region of interest of the object O, in a manner similar to that used for defining the name M for the datum edge E of interest.

The degree of similarity between the edges being analyzed and the datum edge E may be chosen, so that edges having a dimensionally invariant similar shapes, or dimensionally similar shapes, within threshold values according to predetermined criteria, may be identified. Implementation of step 150 on other objects may be similar to that described above for the same object O, mutatis mutandis.

In step 150, the same method as was used for determining the text string M (having a first set of attribute values) of the datum edge E may also be used for the other edges being investigated, for example a new edge E', greatly simplifying the task of identification and comparison with respect to datum edge E. This step will now be described with reference to Examples 1, 2 and 3 above in turn.

Referring to Example 1 or 2, the edge E' is defined using the same manner as E, mutatis mutandis, i.e. using the same type of mathematical function (referring to Example 1) or a plurality of functions where the original edge is divided into a corresponding series of edges (referring to Example 2), and the text string M' associated with a second array of attribute values corresponding to E', is compared to the text string M. In the first place, parity between the two sets of attributes is analysed, to ensure that at least the two text strings relate to the same type of mathematical entity. The degree of matching required for each character/symbol between the two text strings M, M' may be exact, or may be defined in a manner such as to include deviations from the shape or size of edge E' that are acceptable with respect to the datum edge E. For example in some applications it is enough to detect a set of 4 linear segments, in other applications it may be required that these 4 linear segments will altogether create a convex shape while in yet other applications it may be required that all angles between adjoining segments are right angles (defining a rectangle).

Referring to Example 3, matching of a second edge E' with the datum edge E, when both are described by means of HFDL, may be accomplished in a number of ways. For example, the number of vertices in E' may be first be compared with the number of vertices in E, and if there is a match, then the attributes of the vertices are compared by cyclical ordering matching, i.e. there is no significance in which vertex is considered to be the first vertex. For example, in case of an edge E comprising two linear segments and a circular arc, if the library definition or the text string M begins with the attributes relating to an arc while in the actual object being investigated one of the lines is detected first, eventually the arc will also be detected, and the original lines will be "detected" again after getting back to its starting point. According to this aspect of the invention, if the two text strings are equal cyclically a match between edge E and E' has been successfully found, and, in such a case the vertex number in E' that corresponds to the first vertex in E may also be identified.

A simple generalization of this "exact" match is the cyclical matching using a bit mask that determines which attributes are to be taken into account for the matching process.

A further generalization may include a "fuzzy" match that introduces some metrics in the attributes' space and uses pre-defined rules to determine similarity of two attribute sets.

For simple, dimensionally independent shape comparisons, it is only necessary for the attributes of the text strings describing the datum edge E and the new edge E' to match. If it is desired to determine whether the new edge E' also dimensionally matches the datum edge E, it is possible to add attributes or to modify some of aforementioned attributes of vertices, for example $LSR_j$ or $CA_j$ to provide actual dimensions and curvatures for one or more of the particular segments between vertices. In this connection it is to be noted that in some applications of the present invention it may be desired for the edge E' to exactly match edge E in terms of the shape and dimensions thereof, while in other applications it may only be desired to match the shape of edge E' to that of datum edge E independently of dimensional considerations, while in yet other applications it may be desired to fully match the shape, as well as a critical dimension, for example.

Figure 5:
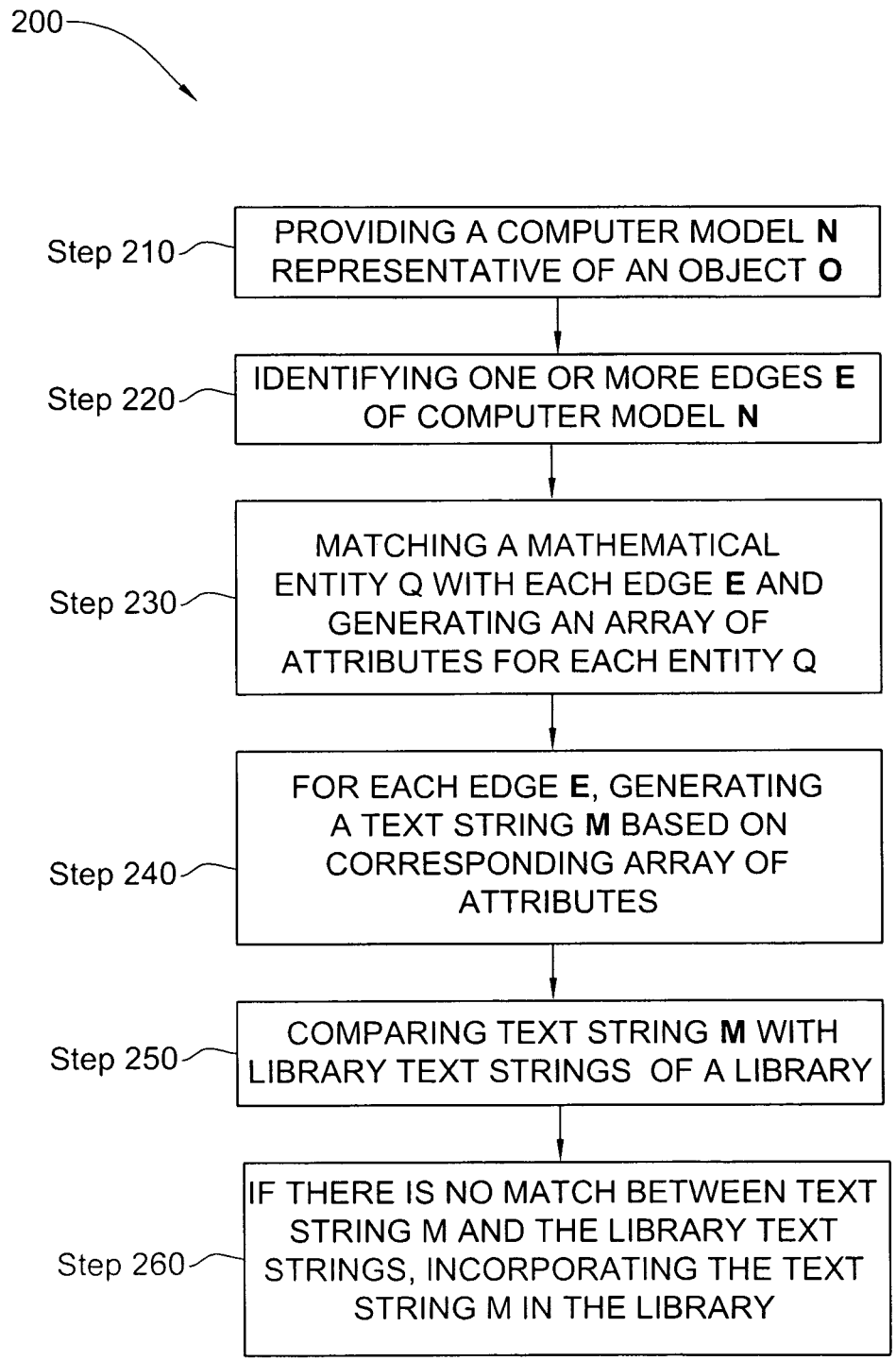
FIG. 5 is a schematic illustration of a method according to another aspect of the invention.

According to another aspect of the invention, and referring to FIG. 5, a method is provided for generating or extending a library associated with edge geometries, and comprises steps similar to those described for the methods described in connection with FIG. 1, mutatis mutandis, with some differences, as will become apparent herein.

For example, steps 210, 220, 230 and 240 are similar to steps 110, 120, 130 and 140, respectively, of the embodiment of FIG. 1, mutatis mutandis.

According to this aspect of the invention, the attributes of the edge E, as defined in the corresponding text string M, may be stored and incorporated into a dynamic library, and thus the method according to this aspect of the invention represents a learning process when the method 100 is implemented by a computer, for example. The corresponding name or text string M of the edge E may be matched against text strings corresponding to existing (known) shapes in a library 80, and if there is no match, indicating that the shape of the edge E is not present in the library, the shape of the geometrical feature or edge E, i.e. in the form of text string M, may be added to the library, exported, or alternatively deleted if desired.

Thus, in step 250, whenever an edge is identified and a text string generated with respect thereto according to the invention, it may then be compared to standard or previously "learned" shapes in a suitable library (e.g. as a memory in a computer that is configured for implementing the method according to the invention). The comparison may be similar to that described for step 150 of the embodiment of FIG. 1, mutatis mutandis, with the difference that, in step 260, if no match may be found in the library for the characteristics/attributes of the new edge, as defined by its text string, the new text string (with its implicit shape characteristics) may be added to the library. The next time the same edge geometry is encountered, it will be possible to identify it with respect to the update library.

Thus, according to this aspect of the invention, the method allows shapes of features such as edges to be "learnt", and for applying this "knowledge" to check for other features which may be similar thereto at least shapewise and optionally also dimensionally and/or with respect to position and/or orientation elsewhere in the same object O or in other objects, which may be particularly useful when such features do not conform to preprogrammed standard shapes such as a circle, square etc.

Thus, by way of example, it may be desired to check that a production line of doors conforms to a quality standard such that the keyhole has a consistent shape and dimensions for the whole production line. First a datum door is provided and the keyhole scanned and analyzed to provide a text string M corresponding to the edge of the keyhole. In such a case, it may be desired to use the HFDL language of Example 3, though other methods for determining the most appropriate text string M may be used instead. Alternatively, the text string M may be synthesized according to nominal design parameters of the keyhole. Then, each door from the production line is in turn scanned, and the shape of the keyhole in each case, as identified and defined in a similar manner to that of the datum door, is compared with the text string M, and a determination can then be made whether the keyhole conforms or not to that of the datum keyhole edge.

According to another aspect of the invention, and referring to FIG. 2, a system 70 is provided for defining and manipulating features of an object, in particular edges thereof, based on the method of the invention according to any aspect thereof. The system 70 comprises computer 30, having an input module for receiving data representative of the object, and/or a virtual model thereof, and for optionally constructing a virtual model representative of an object from data provided by a scanner or other apparatus that is adapted for providing dimensional data of the object. The system may also comprise a library 80, which may be in the form of a computer memory adapted for storing data representative of the characteristics/attributes of edges or other features. The computer 30 comprises a processor configured for executing the method according to the various aspects of the invention, and manipulates the virtual model and defines text strings corresponding to edges, in the same manner as described above, mutatis mutandis.

In another aspect of the present invention, a computer readable medium is provided that embodies in a tangible manner a program executable for carrying out the method of the invention, according to each aspect thereof. In one example, the computer readable medium comprises:

(a) a first set of data representative of an edge of an object;
(b) a second set of data representative of an edge library including characteristics of known or learnt edges;
(c) means for comparing at least a portion of said first set of data with at least a portion of said second set of data; and
(d) means for storing said portion of said first set of data when no match with said second set of data may be found.

The medium may comprise, for example, optical discs, magnetic discs, magnetic tapes, and so on.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. A method for defining an edge geometry of a geometrical feature, comprising:
(A) matching at least one mathematical entity with said edge geometry, wherein the or each said entity is capable of being embodied by a predetermined array of attributes having attribute values such that said array provides sufficient information to enable reconstruction of the corresponding said entity therefrom;
(B) for the or each said entity, generating a corresponding said array of attributes and applying to each said attribute thereof an attribute value chosen from a corresponding predetermined set of attribute values such that said array provides sufficient information to enable reconstruction of the corresponding said entity therefrom, and generating a text string based on said chosen array values whereby to define said edge geometry thereby,
wherein the or each said mathematical entity comprises at least one vertex associated with at least two segments joined thereto such as to match said edge geometry according to predetermined criteria, and wherein said attributes are associated with at least shape-related information regarding said segments and at least one spatial relationship therebetween with respect to said corresponding vertex,
wherein the or each said vertex comprises two said segments joined thereto, and said array of attributes include at least one attribute chosen from the group consisting of vertex type (VT), linear angle (LA), linear convexity (LC), linear size relation (LSR), curve convexity (CC), curve angularity (CA), and virtual segment (VS), and said array of attributes further comprising number of vertices (NV), and
wherein each said attribute of said group has a corresponding attribute value chosen from a corresponding set of attribute values, each corresponding set of attribute values including an undefined or zero attribute value corresponding to the respective attribute being considered unimportant for the respective said vertex.

2. Method according to claim 1, wherein the or each said vertex comprises two said segments jointed thereto, and said array of attributes for at least one said vertex includes at least one attribute chosen from the group consisting of said linear size relation (LSR) and said virtual segment (VS).

3. Method according to claim 2, wherein the or each said vertex comprises two said segments joined thereto, and said array of attributes for each vertex comprises a set of attributes including: said vertex type (VT), said linear angle (LA), said linear convexity (LC), said linear size relation (LSR), said curve convexity (CC), and said curve angularity (CA).

4. Method according to claim 1, wherein said attributes of said group have corresponding attribute values chosen from a corresponding set of attribute values as follows: wherein NV corresponds to the number of vertices in the mathematical entity, and has an attribute value of a numerical integer corresponding to the number of vertices; wherein said VT attribute corresponds to the general shape of the segments joined to the vertex V, and has an attribute value chosen from a said predetermined set of attribute values including: "undefined", "Line-Line", "Line-Arc", "Arc-Line", "Arc-Arc", wherein the sub values Arc and Line refer to at least one or another of said two corresponding segments being one of a nominally rectilinear line and an arc; wherein said LA attribute corresponds to an angular relationship at a vertex between two corresponding said segments, and has an attribute value chosen from a said predetermined set of attribute values including: "undefined", "Acute", "Right", "Obtuse", wherein the angular relationship is respectively unimportant, less than about 90 degrees, nominally 90 degrees and more than 90 degrees; wherein said LC attribute corresponds to a relative spatial relationship between a corresponding said vertex and two other said vertices immediately adjacent thereto, and has an attribute value chosen from a said predetermined set of attribute values including: "undefined", "Convex", "Concave", wherein the spatial relationship is respectively unimportant, the said corresponding vertex lies on a first side of an imaginary line joining said adjacent vertices, or the said corresponding vertex lies on a second, opposed side of said imaginary line; wherein said LSR attribute corresponds to a relative size relationship between a first said segment and a second said segment joined to said vertex, and has an attribute value chosen from a said predetermined set of attribute values including: "undefined", "larger", "Equal", "Smaller" wherein the size relationship is respectively unimportant, said first segment is larger than said second segment, said first segment is nominally the same size as said second segment, said first segment is smaller than said second segment; wherein said CC attribute corresponds to a relative spatial relationship between a said segment, said corresponding vertex and an adjacent vertex also joined to said segment, and has an attribute value chosen from a said predetermined set of attribute values including: "undefined", "Outward", "Inward", wherein respectively the segment is a rectilinear curve, the segment is an arc and lies on a first side of an imaginary line joining said adjacent vertices, or the segment is an arc and lies on a second, opposed side of said imaginary line; wherein said CA attribute corresponds to an angular extent of a said segment, between said corresponding vertex and an adjacent vertex also joined to said segment, and has an attribute value chosen from a said predetermined set of attribute values including: "undefined", "Zero", "Semicircle", "Sharp", "Flat", wherein respectively the angular extent is unimportant, the segment is a rectilinear curve, the segment is an arc of angular length nominally 180 degrees, the segment is an arc of angular length substantially greater than 180 degrees, the segment is an arc of angular length substantially less than 180 degrees; wherein said VS attribute corresponds to the nature of the segment following the vertex and has an attribute value chosen from a said predetermined set of attribute values including: "Undefined", "Real", "Imaginary", wherein respectively the real or imaginary nature of the segment is unimportant, the segment is real, or the segment is imaginary.

5. A method according to claim 1, wherein for at least one said entity, at least one said attribute corresponding thereto comprises a corresponding attribute value that is substantially invariant with respect to a dimension and orientation of said entity.

6. A method according to claim 1, wherein the or each said mathematical entity is matched to said edge such that the or each said vertex thereof corresponds to an identifiable point on or close to said edge, and that said corresponding segments joined to the vertex are each of a shape similar to a shape of a corresponding edge portion of said edge on corresponding sides of said identifiable point, wherein said shape similarity between at least one said segment and its corresponding said edge portion is substantially independent of possible differences therebetween in at least one of scale, orientation and position.

7. A method according to claim 1, wherein said entity comprises a plurality of said vertices, cyclically joined to one another via corresponding said segments, such that each pair of adjacent said vertices is joined by a said segment, and wherein said array further comprises a said attribute having an attribute value corresponding to the number of said vertices constituting said plurality of vertices.

8. A method according to claim 7, wherein said edge geometry constitutes a closed edge.

9. A method according to claim 7, wherein said edge geometry comprises a first free end and a second free end, and wherein said entity comprises an imaginary said segment joining a vertex corresponding to said first free end with a said vertex corresponding to said second free end.

10. A method according to claim 7, wherein the or each said mathematical entity is matched to said edge such that the or each said vertex corresponds to an identifiable point on said edge, and that said corresponding segments joined to the vertex are each of a shape similar to a shape of a corresponding edge portion of said edge on corresponding sides of said identifiable point, wherein said similarity between at least one said segment its said corresponding edge portion is substantially independent of differences therebetween in at least one of scale, orientation and position.

11. A method for identifying an edge geometry of a geometrical feature, comprising: (a) defining said edge geometry to provide a text string according to the method of claim 7; (b) comparing said text string in step (a) with library text strings of a text string library, each said library text string corresponding to a known library mathematical entity; (c) identifying a said library entity having a corresponding said library text string that best matches said text string defined in step (a) according to predetermined criteria.

12. A method according to claim 11, wherein said edge geometry constitutes a closed edge.

13. A method according to claim 11, wherein said edge geometry comprises a first free end and a second free end, and wherein said entity comprises an imaginary said segment joining a vertex corresponding to said first free end with a said vertex corresponding to said second free end.

14. A method according to claim 11, wherein, if no match is found in step (c), further comprising the step of: (d) including said text string of step (a) in said text string library and associating an identification label with the entity corresponding thereto.

15. A method according to claim 11, wherein in step (b) said text string is compared with each said library text string in a cyclic manner, starting at any desired part of said text string, and along any desired direction with respect to the text string.

16. A method for extending a library associated with edge geometries, comprising: (i) providing an edge geometry; (ii) defining said edge geometry to provide a text string according to the method of claim 7; (iii) comparing said text string in step (ii) with library text strings of said text string library, each said library text string corresponding to a known library mathematical entity; (iv) if said text string defined in step (ii) does not match a said library text string according to predetermined criteria, including said text string of step (ii) in said text string library and associating an identification label with the edge geometry corresponding to said text string defined in step (ii).

17. A method according to claim 16, wherein in step (iii) said text string is compared with each said library text string in a cyclic manner, starting at any desired part of said text string, and along any desired direction with respect to the text string.

18. A computer readable medium embodying in a tangible manner a program executable for carrying out the method according to claim 1, wherein the computer readable medium comprises: (a) a first set of data representative of said geometric edge; (b) a second set of data representative of said at least one mathematical entity; (c) means for matching at least a portion of said first set of data with at least a portion of said second set of data; and (d) means for generating said text string from said portion of said second data set that is matched with said portion of said first data set.

19. A medium according to claim 18, said medium comprising any one of optical discs, magnetic discs, and magnetic tapes.

20. A computer readable medium embodying in a tangible manner a program executable for carrying out the method according to claim 11, wherein the computer readable medium comprises: (a) a first set of data representative of said edge; (b) a second set of data representative of said library text strings; (c) means for comparing at least a portion of said first set of data with at least a portion of said second set of data; and (d) means for identifying data in said second data set corresponding to said portion of said first set of data when a match therebetween is found.

21. A computer readable medium embodying in a tangible manner a program executable for carrying out the method according to claim 16, wherein the computer readable medium comprises:
  (a) a first set of data representative of said edge;
  (b) a second set of data representative of said library text strings;
  (c) means for comparing at least a portion of said first set of data with at least a portion of said second set of data; and
  (d) means for storing in said text string library said portion of said first set of data when no match with said second set of data may be found.

22. A medium according to claim 21, said medium comprising any one of optical discs, magnetic discs, and magnetic tapes.

23. A system for defining an edge geometry of a geometrical feature, comprising: (I) an input device for inputting a virtual model corresponding to at least an edge geometry of a geometrical feature; (II) computer processor configured for implementing the method according to claim 1; (III) an output device for outputting said text string generated in step (B).

24. A system for defining an edge geometry of a geometrical feature, comprising:
- (I) an input device for inputting a virtual model corresponding to at least an edge geometry of a geometrical feature;
- (II) computer processor configured for implementing a method for defining an edge geometry of a geometrical feature, comprising:
  - (A) matching at least one mathematical entity with said edge geometry, wherein the or each said entity is capable of being embodied by a predetermined array of attributes having attribute values such that said array provides sufficient information to enable reconstruction of the corresponding said entity therefrom;
  - (B) for the or each said entity, generating a corresponding said array of attributes and applying to each said attribute thereof an attribute value chosen from a corresponding predetermined set of attribute values such that said array provides sufficient information to enable reconstruction of the corresponding said entity therefrom, and generating a text string based on said chosen array values whereby to define said edge geometry thereby,
  - wherein the or each said mathematical entity comprises at least one vertex associated with at least two segments joined thereto such as to match said edge geometry according to predetermined criteria, and wherein said attributes are associated with at least shape-related information regarding said segments and at least one spatial relationship therebetween with respect to said corresponding vertex,
  - wherein the or each said vertex comprises two said segments joined thereto, and said array of attributes include at least one attribute chosen from the group consisting of vertex type (VT), linear angle (LA), linear convexity (LC), linear size relation (LSR), curve convexity (CC), curve angularity (CA), and virtual segment (VS), and said array of attributes further comprising number of vertices (NV), and
  - wherein each said attribute of said group has a corresponding attribute value chosen from a corresponding set of attribute values, each corresponding set of attribute values including an undefined or zero attribute value corresponding to the respective attribute being considered unimportant for the respective said vertex; and
- (III) an output device for outputting said text string generated in step (B),
- wherein said computer processor is further configured for implementing a method according to claim 11, wherein said library is stored in a suitable memory, and wherein said output device is configured for outputting said library entity identified in step (c).

25. A system for defining an edge geometry of a geometrical feature, comprising:
- (I) an input device for inputting a virtual model corresponding to at least an edge geometry of a geometrical feature;
- (II) computer processor configured for implementing a method for defining an edge geometry of a geometrical feature, comprising:
  - (A) matching at least one mathematical entity with said edge geometry, wherein the or each said entity is capable of being embodied by a predetermined array of attributes having attribute values such that said array provides sufficient information to enable reconstruction of the corresponding said entity therefrom;
  - (B) for the or each said entity, generating a corresponding said array of attributes and applying to each said attribute thereof an attribute value chosen from a corresponding predetermined set of attribute values such that said array provides sufficient information to enable reconstruction of the corresponding said entity therefrom, and generating a text string based on said chosen array values whereby to define said edge geometry thereby,
  - wherein the or each said mathematical entity comprises at least one vertex associated with at least two segments joined thereto such as to match said edge geometry according to predetermined criteria, and wherein said attributes are associated with at least shape-related information regarding said segments and at least one spatial relationship therebetween with respect to said corresponding vertex,
  - wherein the or each said vertex comprises two said segments joined thereto, and said array of attributes include at least one attribute chosen from the group consisting of vertex type (VT), linear angle (LA), linear convexity (LC), linear size relation (LSR), curve convexity (CC), curve angularity (CA), and virtual segment (VS), and said array of attributes further comprising number of vertices (NV), and
  - wherein each said attribute of said group has a corresponding attribute value chosen from a corresponding set of attribute values, each corresponding set of attribute values including an undefined or zero attribute value corresponding to the respective attribute being considered unimportant for the respective said vertex; and
- (III) an output device for outputting said text string generated in step (B),
- wherein said computer processor is further configured for implementing a method according to claim 16, wherein said library is stored in a suitable memory, and said computer is configured for storing said text string of step (ii) in said memory and associating an identification label with the edge geometry corresponding thereto.

* * * * *

UNITED STATES PATENT AND TRADEMARK OFFICE
CERTIFICATE OF CORRECTION

| | | |
|---|---|---|
| PATENT NO. | : 8,483,498 B2 | Page 1 of 1 |
| APPLICATION NO. | : 11/902258 | |
| DATED | : July 9, 2013 | |
| INVENTOR(S) | : Brailovsky | |

It is certified that error appears in the above-identified patent and that said Letters Patent is hereby corrected as shown below:

In the Claim

Column 20 Claim 3, Line 1

Please delete "...to claim 2, wherein..."

and replace with -- ...to claim 1, wherein... --

Signed and Sealed this
Twenty-ninth Day of April, 2014

Michelle K. Lee
*Deputy Director of the United States Patent and Trademark Office*